(No Model.)
S. E. RABBITT.
FIREPROOF PARTITION FOR BUILDINGS.
No. 579,839. Patented Mar. 30, 1897.
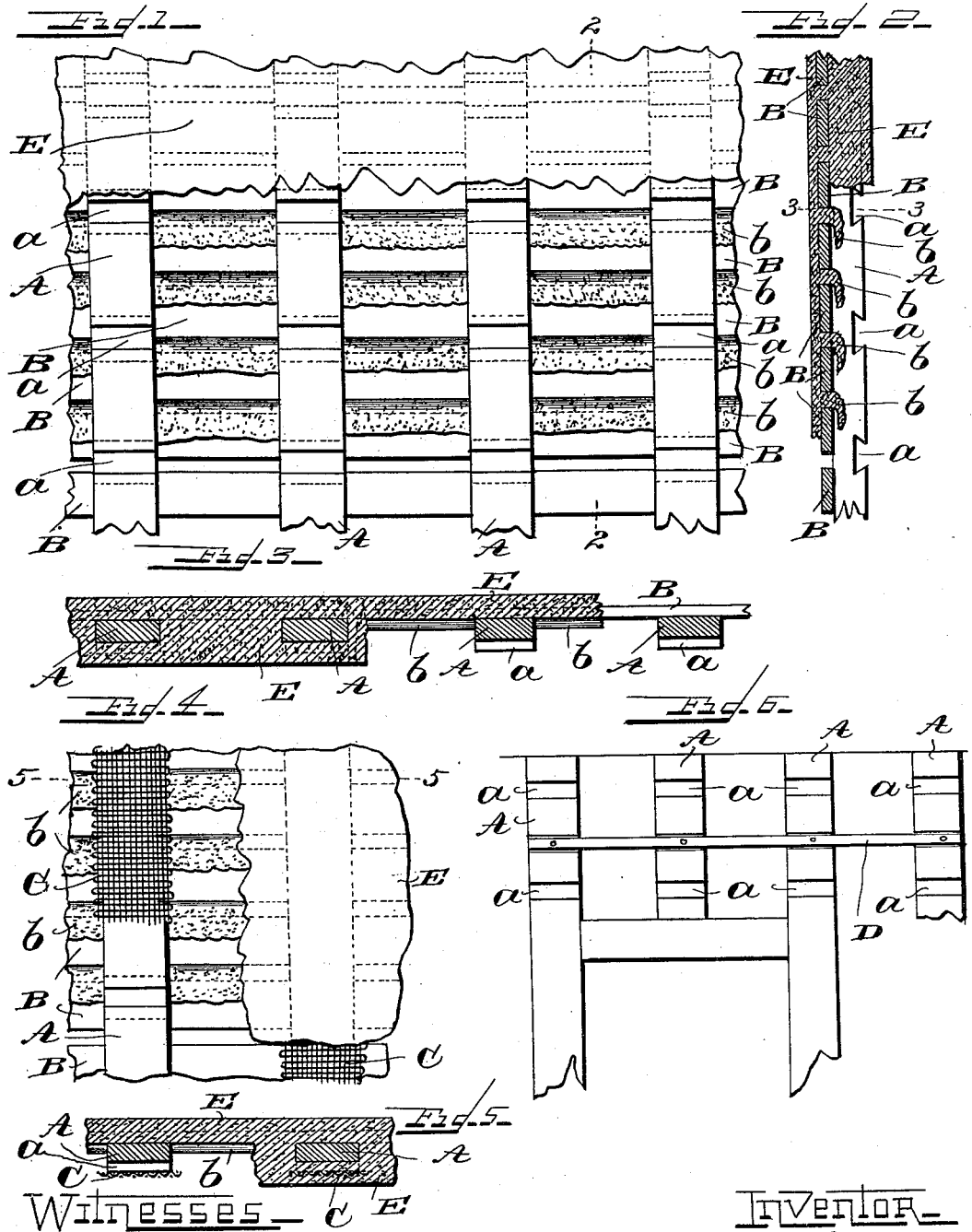
Witnesses
G. A. Tauberschmidt
D. W. Reinohl
Inventor
Samuel E. Rabbitt.
By D. C. Reinohl
Atty.
THE NORRIS PETERS CO., PHOTO-LITHO., WASHINGTON, D. C.

UNITED STATES PATENT OFFICE.

SAMUEL E. RABBITT, OF WASHINGTON, DISTRICT OF COLUMBIA.

FIREPROOF PARTITION FOR BUILDINGS.

SPECIFICATION forming part of Letters Patent No. 579,839, dated March 30, 1897.

Application filed April 22, 1896. Renewed January 20, 1897. Serial No. 619,974. (No model.)

*To all whom it may concern:*

Be it known that I, SAMUEL E. RABBITT, a citizen of the United States, residing at Washington, in the District of Columbia, have invented certain new and useful Improvements in Fireproof Partitions for Buildings; and I do hereby declare the following to be a full, clear, and exact description of the invention, such as will enable others skilled in the art to which it appertains to make and use the same.

My present invention relates to the construction of buildings, has especial reference to partitions, and has for its object a fire, rat, germ, and vermin proof structure, presenting a solid composite partition of wood and plastic material, preferably cement, which shall be as thin as practicable to secure strength and rigidity of construction.

The invention will be fully disclosed in the following specification and claims.

In the accompanying drawings, which form part of this specification, Figure 1 represents an elevation; Fig. 2, a vertical section on the line 2 2, Fig. 1; Fig. 3, a transverse section on the line 3 3, Fig. 2; Fig. 4, an elevation of a modified construction; Fig. 5, a transverse section on the line 5 5, Fig. 4; and Fig. 6, an elevation showing the application of a brace to the studding or body of the partition.

Reference being had to the drawings and the letters thereon, A indicates studs which are provided with transverse grooves a, preferably undercut to form a key of the plastic material used in the construction of partitions. B are laths secured to the studs A on the side opposite the grooves a, and are separated sufficiently to leave space between them for the plastic material to fill and form an overhanging key b on the inside of the laths, as shown.

For ordinary purposes where the ceilings are about eight feet high the studs are about two inches wide and about one inch thick and are placed about twelve inches apart and secured at their upper and lower ends in the usual manner. In ceilings of greater height the studs may be set closer to suit requirements. The grooves a are about three inches apart.

To further secure the plastic material to the grooved face of the studs A, a strip of woven-wire cloth C, slightly overhanging or extending beyond the edges of the studs, as shown in Figs. 4 and 5, may be secured to the studs. The plastic material is embedded in the meshes or interstices and under the overhanging edges of the wire-cloth and prevents the plastic material being separated from the studs by any jarring effect produced upon the partition.

As a further means of strengthening the partition in high-ceiling compartments, a brace D may be applied to stiffen the short sections of studding over doorways, as shown in Fig. 6, the brace being placed in the grooves a so that they will be completely embedded in the plastic material.

The studs A having been properly spaced and secured, the laths B are applied to the plain side of the studs, after which the plastic material E is applied to the surface of the laths and well driven through the spaces between the laths, forming the keys b on the inside of the laths, and the whole coating allowed to set. The plastic material is then applied to the opposite side of the partition and well worked under and around the keys b into the grooves a and the meshes of the woven wire and under its projecting edges when used, and when it is not used the plastic material is applied directly to the surface of the studs between the grooves a, thus completely embedding the studding or body of the partition and forming a solid body of plastic material the thickness of the partition at the parts thereof between the laths throughout the height and length of the structure.

The partition thus constructed, with studs one inch thick, laths of maximum thickness, three-eighths of an inch thick, and a plastic covering of three-sixteenths of an inch over the outer surfaces of the studs and the laths, is one inch and three-quarters thick, and when cement is used as the plastic material forms an absolutely fire, rat, germ, and vermin proof structure.

Having thus fully described my invention, what I claim is—

1. A body for a partition composed of studs having transverse grooves on one side and laths secured to the opposite sides of the studs, in combination with plastic material filling the spaces between the studs and between the laths, embedding and covering said body.

2. A partition composed of a body consisting of vertical studs having transverse grooves on one side and a strip of wire-cloth covering said side, and laths secured to the opposite sides of the studs, in combination with plastic material filling the spaces between the studs and between the laths and covering the outer surfaces of the studs and the laths.

In testimony whereof I affix my signature in presence of two witnesses.

SAMUEL E. RABBITT.

Witnesses:
D. C. REINOHL,
D. WEIMER REINOHL.